United States Patent
Warmack

(10) Patent No.: US 11,221,896 B2
(45) Date of Patent: Jan. 11, 2022

(54) SYSTEMS AND METHODS FOR API REQUEST CONVERSION

(71) Applicant: Idera, Inc., Houston, TX (US)

(72) Inventor: Robert Warmack, Katy, TX (US)

(73) Assignee: Idera, Inc., Houston, TX (US)

( * ) Notice: Subject to any disclaimer, the term of this patent is extended or adjusted under 35 U.S.C. 154(b) by 0 days.

(21) Appl. No.: 17/150,371

(22) Filed: Jan. 15, 2021

(65) Prior Publication Data

US 2021/0224145 A1    Jul. 22, 2021

Related U.S. Application Data

(60) Provisional application No. 62/964,462, filed on Jan. 22, 2020.

(51) Int. Cl.
*G06F 9/54* (2006.01)
*H04L 29/06* (2006.01)
*G06F 9/445* (2018.01)

(52) U.S. Cl.
CPC .......... *G06F 9/547* (2013.01); *G06F 9/44505* (2013.01); *H04L 67/40* (2013.01)

(58) Field of Classification Search
CPC .......... G06F 9/541; G06F 9/547; H04L 67/40
See application file for complete search history.

(56) References Cited

U.S. PATENT DOCUMENTS

| | | | |
|---|---|---|---|
| 2017/0116048 A1* | 4/2017 | Zhang | G06F 9/44 |
| 2018/0341477 A1* | 11/2018 | Kulkarni | G06F 8/76 |
| 2019/0230169 A1* | 7/2019 | Elangovan | H04L 63/108 |
| 2019/0272169 A1* | 9/2019 | Russell | G06F 8/20 |
| 2019/0319860 A1* | 10/2019 | Seed | H04L 67/30 |
| 2020/0387415 A1* | 12/2020 | Take | G06Q 50/10 |
| 2020/0409776 A1* | 12/2020 | Jouhier | G06F 40/143 |

* cited by examiner

*Primary Examiner* — Brian W Wathen
(74) *Attorney, Agent, or Firm* — Foley & Lardner LLP

(57) ABSTRACT

A method or system for application program interface (API) request conversion, includes generating a plurality of configuration files, each associated with a different API format. A first API format of the first API request is identified and a first configuration file is identified based on the first API format. A second API request having a second API format is generated by applying the first API request to the first configuration file. A third API request is received and a third API format of the third API request is identified. A second configuration file is identified based on the third API format. A fourth API request is generated having the second API format by applying the third API request to the second configuration file.

20 Claims, 5 Drawing Sheets

SYSTEMS AND METHODS FOR API REQUEST CONVERSION

CROSS-REFERENCE TO RELATED APPLICATION

The present application claims the benefit of and priority to U.S. Provisional patent Application No. 62/964,462, filed Jan. 22, 2020, the entirety of which is incorporated by reference herein.

BACKGROUND

The present disclosure relates generally to systems and methods for integrating systems using different application programming interface structures (APIs). The present disclosure relates more particularly to converting API requests in multiple formats to a common format.

The technological landscape of APIs is ever growing, forking, fragmenting, and recombining. While this provides users and developers with a large number of choices when it comes to how and when to interface with new systems, it can be difficult for the new systems to communicate or otherwise integrate with each other. In one example, to interface or integrate between modern web-based systems, APIs are used. If a user is interested in integrating or allowing different systems to communicate with each other, the user may have to constantly update the code to interface with the systems' APIs and formats thereof, which can be considerably different. This can result in "code rot" in which code gradually deteriorates or becomes unusable over time due to the failure to adequately integrate with the different APIs or failure to keep up with the updates of those APIs.

The above information disclosed in this Background section is for enhancement of understanding of the background of the disclosure, and therefore, it can contain information that does not constitute prior art.

SUMMARY

Certain examples described herein relate to a method for application program interface (API) request conversion, including: generating, by one or more processors, a plurality of configuration files, each configuration file associated with a different API format; receiving, by the one or more processors, a first API request; identifying, by the one or more processors, a first API format of the first API request; and identifying, by the one or more processors, a first configuration file of the plurality of configuration files based on the first API format. The method further includes generating, by the one or more processors, a second API request having a second API format by applying the first API request to the first configuration file. The method further includes: receiving, by the one or more processors, a third API request; identifying, by the one or more processors, a third API format of the third API request; identifying, by the one or more processors, a second configuration file of the plurality of configuration files based on the third API format; and generating, by the one or more processors, a fourth API request having the second API format by applying the third API request to the second configuration file to generate a fourth API request having the second API format.

In further examples, the method further includes: identifying, by the one or more processors, an endpoint at which the first API request is directed; retrieving, by the one or more processors, data from the endpoint based on the second API request having the second API format; converting, by the one or more processors, the data from the endpoint into the first format; and transmitting, by the one or more processors, the data from the endpoint in the first format.

In further examples, the method further includes: identifying, by the one or more processors, an endpoint at which the first API request is directed; retrieving, by the one or more processors, data from the endpoint based on the second API request having the second API format; and transmitting, by the one or more processors, the data from the endpoint in the second format.

In further examples, identifying the first API format includes receiving, by the one or more processors, an indication of a source of the first API request; and identifying, by the one or more processors, the first API format based on the source of the first API request.

In further examples, the second API format has a different structure than the first API format and the third API format.

In further examples, generating the second API request includes: parsing, via the configuration file and by the one or more processors, the first API request to identify first one or more parameters; comparing, via the configuration file and by the one or more processors, the first one or more parameters to a data structure, the data structure comprising a plurality of parameters associated with the second API format; and generating, via the configuration file and by the one or more processors, second one or more parameters associated with the second API format based on the comparison of the first one or more parameters to the data structure.

In further examples, the second API format is one of Extensible Markup Language, Yet another markup language, or JavaScript Object Notation.

In further examples, the first API request includes authentication information in the first format, and wherein the second API request comprises the authentication information in the second format.

In further examples, generating the second API request includes obtaining, by the one or more processors, endpoints from which to receive data by recursively applying, by the one or more processors, the first API request to the first configuration file.

In further examples, recursively applying the first API request to the first configuration file includes: obtaining variables indicating endpoints to specify in an API request by applying the first API request to the first configuration; and applying the first API request to the first configuration file for a second time but with the obtained variables indicating the endpoints.

In further examples, generating the second API request includes: parsing, via the configuration file by the one or more processors, the first API request to identify first one or more parameters; comparing, via the configuration file by the one or more processors, the first one or more parameters to a data structure, the data structure comprising a plurality of parameters associated with the second API format; and determining, via the configuration file by the one or more processors, second one or more parameters of the first one or more parameters that do not correspond to a parameter of the plurality of parameters based on the comparison of the first one or more parameters. In such further examples, the method further includes: generating, by the one or more processors, an alert indicating that the second one or more parameters could not be transformed into the second format; and displaying, by the one or more processors, the alert on a user interface.

In further examples, the method further includes: receiving, by the one or more processors, a fifth API request having a fifth format; comparing, by the one or more processors, an identification of the fifth format to a database; determining, by the one or more processors, that there is not a configuration file associated with the fifth format based on the comparison of the identification of the fifth format to the database; generating, by the one or more processors, an alert indicating that there is not a configuration file associated with the fifth format; and displaying, by the one or more processors, the alert on a user interface.

In further examples, the first API request includes authentication information appended to the first API request, and the authentication information is transmitted to an endpoint without being converted to another format.

In further examples, generating the second API request includes generating an array having values from a plurality of locations of an endpoint.

Further examples relate to a system for application program interface (API) request conversion, where the system includes one or more processors and memory coupled to the one or more processors and storing instructions that, when executed by the one or more processors, cause the one or more processors to: generate a plurality of configuration files, each configuration file associated with a different API format; receive a first API request; identify a first API format of the first API request; identify a first configuration file of the plurality of configuration files based on the first API format; generate a second API request having a second API format by applying the first API request to the first configuration file; receive a third API request; identify a third API format of the third API request; identify a second configuration file of the plurality of configuration files based on the third API format; and generate a fourth API request having the second API format by applying the third API request to the second configuration file to generate a fourth API request having the second API format.

In further examples of the system, the instructions, when executed, further cause the processor to: identify endpoint at which the first API request is directed; retrieve data from the endpoint based on the second API request having the second API format; convert the data from the endpoint into the first format; and transmit the data from the endpoint in the first format.

In further examples of the system, the instructions, when executed, further cause the processor to: identify an endpoint at which the first API request is directed; retrieve data from the endpoint based on the second API request having the second API format; and transmit the data from the endpoint in the second format.

In further examples of the system, the instructions, when executed, cause the processor to identify the first API format: receiving an indication of a source of the first API request; and identifying the first API format based on the source of the first API request.

In further examples of the system, the second API format has a different structure than the first API format and the third API format.

In further examples of the system, generating the second API request includes: parsing, via the configuration file, the first API request to identify first one or more parameters; comparing, via the configuration file, the first one or more parameters to a data structure, the data structure comprising a plurality of parameters associated with the second API format; and generating, via the configuration file, second one or more parameters associated with the second API format based on the comparison of the first one or more parameters to the data structure.

DETAILED DESCRIPTION

Figure 1:
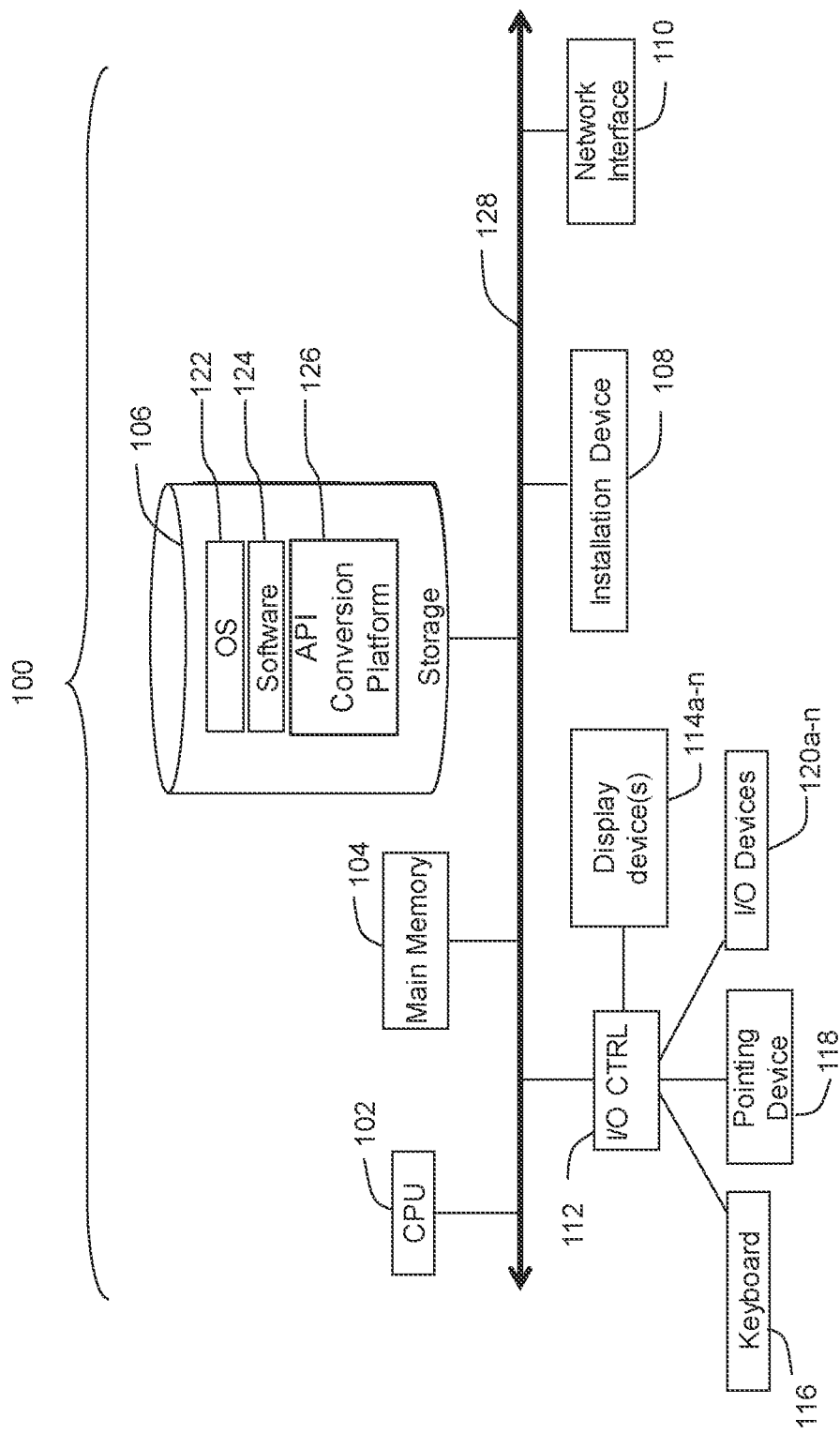
FIG. 1 is a block diagram of a computing device, according to some arrangements.

Hereinafter, example implementations will be described in more detail with reference to the accompanying drawings, in which like reference numbers refer to like elements throughout. The present disclosure, however, can be embodied in various different forms, and should not be construed as being limited to only the illustrated examples herein. Rather, these examples are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure cannot be described. Unless otherwise noted, like reference numerals denote like elements throughout the attached drawings and the written description.

As software "eats the world," the technological landscape is ever growing, forking, fragmenting, and recombining. While this growth provides users and developers alike with a plethora of choices when it comes to how and when to interface with new systems, the inevitable outcome of this growth is interoperability issues and difficulty of integration. This is because different APIs use different syntaxes, codes, and so on for the same functions, requests, jobs, commands, etc.

The common language/interface for integrating modern web-based system may be the application programming interface (API). Unfortunately, each product/service has its own unique API that is constantly evolving and changing. If one is interested in integrating with another system's API, one may have to constantly update their own to understand changes in the integrated system's API. This may cause "code rot" where code ceases to work due to its dependencies changing over time. This issue may be familiar to any developer who has maintained an integrated project for a prolonged period of time.

As disclosed, by implementing the proposed systems and methods described herein, API structures may be abstracted or converted into corresponding configuration files. Such configuration files may be used to extract data from API requests and generate API requests in any format that an operator chooses without managing any underlying complexities of the underlying communication between different API. That is, the systems and methods disclosed herein can convert API requests originating from different APIs into a uniform API format for a client system to consume, so that the operator of the client system does not need to manage the complexities of the different API formats.

Computing Device

Referring now to FIG. 1, a block diagram of a computing device 100 is shown, according to some arrangements. The computing device 100 may be useful for practicing one or more arrangements of the present disclosure. As shown in FIG. 1, in some arrangements, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 may include, without limitation, an operating system (OS) 122, software 124, and a software instance of an API conversion platform (or tool). The computing device 100 may also include additional optional elements, for example, such as a memory port, a bridge, one or more input/output devices 120 (e.g., 120a-120n), and cache memory in communication with the central processing unit 102.

In some arrangements, the central processing unit 102 may be any suitable logic circuitry that responds to and processes instructions fetched from the main memory unit 104. In some arrangements, the central processing unit 102 is provided by a microprocessor unit. For example, in some arrangements, the microprocessor unit may include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 may be based on any of these processors, or any other suitable processor capable of operating as described herein. In various arrangements, the central processing unit 102 may utilize instruction level parallelism, thread level parallelism, different levels of cache, and/or multi-core processors. A multi-core processor may include two or more processing units on a single computing component. Examples of a multi-core processors include the AMD PHENOM IIX2, INTEL CORE i5 and INTEL CORE i7.

In some arrangements, the main memory unit 104 may include one or more memory chips capable of storing data and allowing any storage location to be directly accessed by the central processing unit 102. In some arrangements, the main memory unit 104 may be volatile and faster than the storage device 106. In various arrangements, the main memory unit 104 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some arrangements, the main memory 104 or the storage device 106 may be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 may be based on any of the above described memory chips, or any other available memory chips capable of operating as described herein. In some arrangements, the central processing unit 102 communicates with the main memory unit 104 via a system bus 128 (described in more detail below). In other arrangements, the central processing unit 102 may communicate directly with the main memory unit 104 via a memory port.

In some arrangements, the central processing unit 102 may communicate directly with cache memory via a secondary bus, sometimes referred to as a backside bus. In other arrangements, the central processing unit 102 may communicate with cache memory using the system bus 128. Cache memory typically has a faster response time than the main memory unit 104, and is typically provided by SRAM, BSRAM, or EDRAM. In some arrangements, the central processing unit 102 communicates with various I/O devices 120 via a local system bus (e.g., the system bus 128). Various buses may be used to connect the central processing unit 102 to any of the I/O devices 120, including a PCI bus, a PCI-X bus, or a PCI-Express bus, or a NuBus. In arrangements in which the I/O devices 120 include a video display device 114, the central processing unit 102 may use an Advanced Graphics Port (AGP) to communicate with the display device 114 or the I/O controller 112 for the display device 114.

In various arrangements, a wide variety of I/O devices 120a-120n may be included in the computing device 100. For example, in various arrangements, the input devices of the I/O devices 120a-120n may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various arrangements, the output devices of the I/O devices 120a-120n may include, for example, video displays, graphical displays, speakers, headphones, inkjet printers, laser printers, and/or 3D printers.

In some arrangements, I/O devices 120a-120n may include a combination of multiple input or output devices, such as, for example, Microsoft KINECT, Nintendo Wiimote for the WM Nintendo WII U GAMEPAD, Apple IPHONE, Android based smart phones, and/or the like. In some arrangements, some of the I/O devices 120a-120n may allow gesture recognition inputs through a combination of some of the inputs and outputs. In some arrangements, some of the I/O devices 120a-120n may provide for facial recognition, which may be utilized as an input for different purposes including authentication and other commands. In some arrangements, some of the I/O devices 120a-120n may provide for voice recognition and inputs, such as, for example, Microsoft KINECT, SIRI for IPHONE by Apple, Google Now or Google Voice Search, and/or the like.

In some arrangements, addition I/O devices 120a-120n may have both input and output capabilities, including, for example, haptic feedback devices, touchscreen displays, multi-touch displays, and/or the like. Touchscreen, multi-touch displays, touchpads, touch mice, or other touch sensing devices may use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like.

Some multi-touch devices may allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, may have larger surfaces, such as on a table-top or on a wall, and may also interact with other electronic devices. In some arrangements, some of the I/O devices 120a-120n, display devices 114a-114n, or group of devices may be augment reality devices. In some arrangements, the I/O devices (e.g., keyboard 116, pointing device 118, display devices 114, and/or I/O devices 120) may be controlled by the I/O controller 112. In some arrangements, an I/O device may also provide storage and/or an installation medium (e.g., installation device 108) for the computing device 100. In still other arrangements, the computing device 100 may provide USB connections to receive handheld USB storage devices. In further arrangements, an I/O device 120 may be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some arrangements, the display devices 114a-114n may be connected to the I/O controller 112. In various arrangements, the display devices 114a-114n may include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays may include, for example, stereoscopy, polarization filters, active shutters, autostereoscopy, and/or the like. Display devices 114a-114n may also include a head-mounted display (HMD). In some arrangements, display devices 114a-114n or the corresponding I/O controllers 112 may be controlled through or have hardware support for OPENGL, DIRECTX API, and/or other graphics libraries.

In some arrangements, the computing device 100 may include or connect to multiple display devices 114a-114n, which each may be of the same or different type and/or form. As such, any of the I/O devices 120a-120n and/or the I/O controller 112 may include any type and/or form of suitable hardware, software, or combination of hardware and software to support, enable or provide for the connection and use of multiple display devices 114a-114n by the computing device 100. For example, the computing device 100 may include any type and/or form of video adapter, video card, driver, and/or library to interface, communicate, connect or otherwise use the display devices 114a-114n. In one arrangement, a video adapter may include multiple connectors to interface to multiple display devices 114a-114n. In other arrangements, the computing device 100 may include multiple video adapters, with each video adapter connected to one or more of the display devices 114a-114n. In some arrangements, any portion of the operating system 122 of the computing device 100 may be configured for using multiple displays 114a-114n. In other arrangements, one or more of the display devices 114a-114n may be provided by one or more other computing devices connected to the computing device 100, via a network. In some arrangements software may be designed and constructed to use another computer's display device as a second display device 114a for the computing device 100. For example, in one arrangement, an Apple iPad may connect to a computing device 100 and use the display of the computing device 100 as an additional display screen that may be used as an extended desktop. One of ordinarily skill in the art will recognize and appreciate the various ways and arrangements that a computing device 100 may be configured to have multiple display devices 114a-114n.

In some arrangements, the storage device 106 (e.g. one or more hard disk drives or redundant arrays of independent disks) may store the operating system 122, and/or other related software, and may store application software programs such as any program related to the software instance of the API conversion platform 126. Examples of the storage device 106 may include hard disk drive (HDD), optical drive including CD drive, DVD drive, and/or BLU-RAY drive, solid-state drive (SSD), USB flash drive, and/or any other suitable device for storing data. Some storage devices 106 may include multiple volatile and non-volatile memories, such as, for example, solid state hybrid drives that combine hard disks with solid state cache. Some storage devices 106 may include non-volatile, mutable, and/or read-only. Some storage devices 106 may be internal and may connect to the computing device 100 via the bus 128. Some storage devices 106 may be external and may be connect to the computing device 100 via an I/O device 120 that provides an external bus. Some storage devices 106 may connect to the computing device 100 via the network interface 110 over a network, such as, for example, the Remote Disk for MACBOOK AIR by Apple. Some computing devices 100 may not require a non-volatile storage device 106 and may be thin clients or zero clients. Some storage devices 106 may also be used as an installation device 108, and may be suitable for installing software and programs. Additionally, the operating system and the software can be run from a bootable medium, for example, such as a bootable CD (e.g. KNOPPIX), which may be a bootable CD for GNU/Linux that is available as a GNU/Linux distribution from knoppix.net.

In some arrangements, the computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on the computing device 100. An application distribution platform may include a repository of applications on a server or a cloud, which the computing device 100 may access over a network (e.g., the Internet). An application distribution platform may include application developed and provided by various developers. A user of the computing device 100 may select, purchase, and/or download an application via the application distribution platform.

In some arrangements, the computing device 100 may include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one arrangement, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some arrangements, the network interface 110 may include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some arrangements, the computing device 100 may operate under the control of the operating system 122, which controls scheduling of tasks and access to system resources. In various arrangements, the computing device 100 may run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but may include others. Some operating systems 122, including, for example, the CHROME OS by Google, may be used on zero clients or thin clients (e.g., CHROMEBOOKS).

In various arrangements, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some arrangements, the computing device 100 may have different processors, operating systems, and input devices consistent with the device.

In some arrangements, the computing device 100 may be a gaming system. For example, the computing device 100 may include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, NINTENDO WII U, and/or Nintendo Switch device manufactured by Nintendo Co., Ltd., of Kyoto, Japan, an XBOX 360, XBOX one, and/or the like manufactured by the Microsoft Corporation of Redmond, Wash., and/or the like.

In some arrangements, the computing device 100 may be a digital audio player such as the Apple IPOD, IPOD Touch, and IPOD NANO lines of devices, manufactured by Apple Computer of Cupertino, Calif. Some digital audio players may have other functionality, including, for example, a gaming system or any functionality made available by an application from a digital application distribution platform. For example, the IPOD Touch may access the Apple App Store. In some arrangements, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some arrangements, the computing device 100 may be a tablet, for example, such as the IPAD line of devices by Apple; GALAXY TAB family of devices by Samsung; KINDLE FIRE, by Amazon.com, Inc. of Seattle, Wash.; and/or the like. In other arrangements, the computing device 100 may be a eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to these examples. For example, other suitable computing devices and/or components thereof relating to one or more of the various aspects of the operating environments and components described above in the context of the systems and methods disclosed herein are contemplated, as will be apparent to those having ordinary skill in the art.

API Conversion Platform

Figure 2:
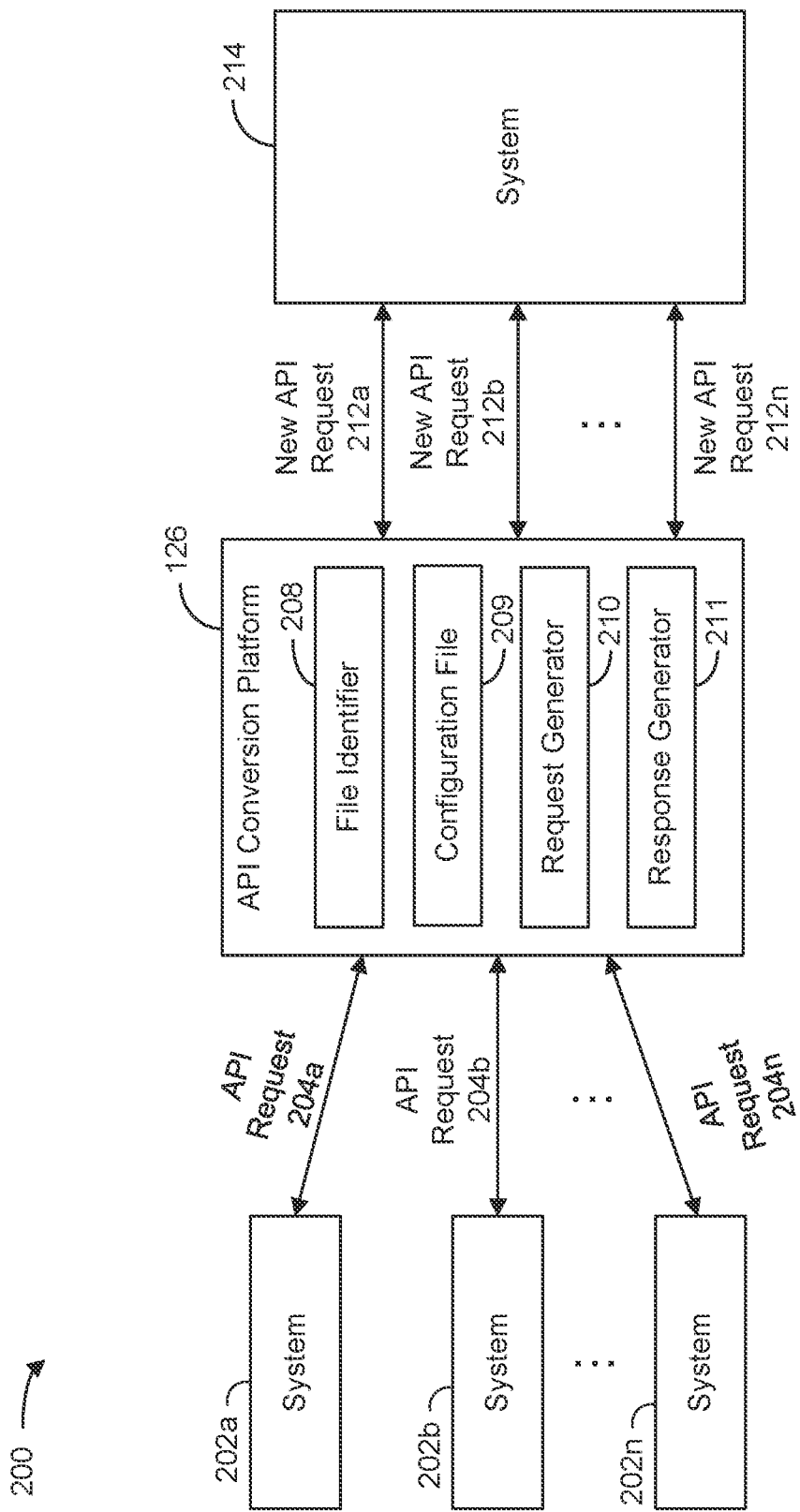
FIG. 2 is a block diagram depicting an example API request conversion sequence, according to some arrangements.

Referring now to FIG. 2, a block diagram depicting an example API request conversion sequence 200 is shown, according to some arrangements. The API request conversion sequence 200 is shown to include systems 202a-202n making corresponding API requests 204a-204n to obtain information from a system 214 (e.g., a server providing and maintaining webpages). Systems 202a-202n may send API requests 204a-204n in varying formats based on the APIs that the respective ones of the system 202a-202n use to generate the request. For example, the system 202a may use an API from a software development kit (SDK) to request information about a webpage that is maintained by system 214. In one example, the API from the SDK of the system 202a may generate API request 204a in an XML format. The system 202b may use an API from another SDK to request information about another webpage that is maintained by the system 214. The API of the system 202b may generate the API request 204b in a JSON format. The system 202n may use an API from yet another SDK to request information about a third webpage that is maintained by the system 214. The API of the system 202n may generate the API request 204n in a BSON format. Each of the API requests 204a-204n may be transmitted to an API conversion platform 126. The API requests 204a-204n may each be in any format. The API conversion platform 126 may receive the API requests 204a-204n and generate new API requests 212a-212n in a common (same) format such as but not limited to, YAML, to transmit to the system 214. As such, each of the API requests 212a-212n may have the same format. This allows the system 214 to consume API requests in a single format instead of dealing with the API requests 204a-204n in different formats (e.g., formats A, B, and C).

Each of the systems 202a-202n may be any system that can make requests to obtain information from system 214. The systems 202a-202n may be associated with different entities from each other and/or from the system 214 or be a part of the same entity. As described herein, an entity may be a computer processor, server, company, person, application, or an any other entity that may have an API to send and receive API requests. For example, each of the systems 202a-202n and the system 214 may be any type of computing component (e.g., a server, processor, mobile phone, tablet, laptop, personal computer, etc.). In some arrangements, each of the systems 202a-202n may be similar to the computing device 100, shown and described with reference to FIG. 1. In some arrangements, each of the systems 202a-202n is a part of the same entity. For example, the system 202a may be a browser being executed by a processor of a computer while the system 214 may be an application executed by the same processor that generates a user interface for a game. In another example, the system 202b may be a browser and the system 214 may be or be associated with a remote database (e.g., a database stored by a third party). The systems 202a-202n may send the API requests 204a-202n to the system 214 via APIs that are specific to the respective ones of the systems 202a-202n.

Each API request may include one or more parameters. A parameter is a type of data that is being requested in an API request. For example, an API request may ask for a number of users that used a website on a specific date (e.g., January 1$^{st}$). The parameter in the request would be the number of users. APIs may include any number of parameters in their requests and the parameters may be of any data type.

Each API of the systems 202a-202n may send API requests with API formats that are specific to the API (although one or more API formats may be common across various APIs of different ones of the systems 202a-202n). An API format may be the format in which data in the body and/or the header of an API request is positioned and any words, symbols, or phrases that are used to make such API requests. Each API format may differ in its structure, wording, or syntax. Examples of API formats include, but are not limited to, JSON, BSON, YAML, XML, and so on. An example body of an API request in JSON may be the following:

```
{
    "Name": "",
    "Address": "",
    "Phone Number": ""
}
```

In this example API request, the API is requesting the name, address, and phone number of a person from an endpoint. Each of the name, address, and phone number may be a parameter. The request may be sent to an API of the endpoint (e.g., an entity that store the API that receives the request and in some cases, that store data for the for the API to retrieve) to be processed. An example body of an API request for the same parameters in XML, may be the following:

```
<tsRequest>
    <Name: "">,
    <Address: "">,
    <Phone Number": "">
<tsRequest>
```

While example API formats are presented herein for illustrative purposes, the API formats may take any form and request any information.

Different APIs can read and write in different API formats. For example, when generating an API request, an API may indicate, in a header of the request, the API format of the body of the request. Consequently, the API that receives the request can identify the API format of the request and determine whether it can read or write in the same format. In some arrangements, the request may also include an indication of the API format in which it would like to receive the response. In some arrangements, an administrator may identify the API format of the request. As described below, the API conversion platform 126 may identify which format each of the API requests 204a-204n is in (either based on an administrator input or from the header), identify a configuration file corresponding to the API format, and apply the API request to the configuration file to generate a new request (e.g., one of the requests 212a-212n) that is readable by the API to which the API request is directed (e.g., to the API of the endpoint of the request).

The API conversion platform 126 may be a software program executed on the computing device 100, shown and described with reference to FIG. 1. In some arrangements, the API conversion platform 126 may be hosted on a cloud computing platform including one or more controllers, servers, and/or any other suitable computing devices that can be accessed by the computing device 100 over a network (e.g., the Internet) via the network interface 110. The API conversion platform 126 may be an interfacing software program that enables APIs that send requests in any format to communicate with an API on the system 214 that does not necessarily have the capability to communicate in the same format. For example, in some arrangements, the API conversion platform 126 may receive API requests in one or more of XML, YAML, JSON, and so on and generate new requests requesting the same data in a new format that the API on the system 214 can read and process. The API conversion platform 126 may also enable the API on the computing device 100 to respond to the request so the requesting API may read the response.

For example, the API conversion platform 126 may include a file identifier 208, a configuration file 209, a request generator 210, and a response generator 211. The file identifier 208 may be a software program executed on the computing device 100, shown and described with reference to FIG. 1. The file identifier 208 may include programmed instruction to receive API requests and identify the format of the API requests from their headers. The file identifier 208 may determine whether the API request may be converted into an API request to which an API of the system 214 may read and respond by comparing the identified format of the API request to configuration files stored in the API conversion platform 126. If the file identifier 208 can identify a configuration file corresponding to the format of an API request, the file identifier 208 may apply the API request to the corresponding configuration file so the request generator 210 can generate a new API request in the API format that is readable to the API of system 214.

The configuration file 209 may be a software program executed on the computing device, shown and described with reference to FIG. 1. The configuration file 209 may include programmed instructions and represent an example configuration file that can receive API requests in one format and generate arrays requesting the same parameters as the API requests but in a new format that the API of the system 214 may read. The configuration file 209 may generate the arrays in the new format by identifying the requested parameters in the original API request and determine how the parameters would be requested in the new format. In some arrangements, the configuration file 209 may be used to determine how the parameters would be requested in the new format by comparing the request to a data structure that stores corresponding parameters in the new format. The configuration file 209 may identify matching parameter requests and generate new parameter requests in the new format. The request generator 210 may identify the parameter requests in the new format and generate a new API request in the new format. The request generator 210 may transmit the new request to the system 214 to obtain the requested information.

The response generator 211 may be a software program executed on the computing device, shown and described with reference to FIG. 1. The response generator 211 may include programmed instructions to obtain the requested information from the endpoint and generate a response in a format that the requesting API can understand. In some arrangements, the response generator 211 may format the response in a format that the requesting API requested in the header of the API request. In some arrangements, the response generator 211 may generate the response based on the format in which the requesting API made the request. Once the response generator 211 generates the response, the response generator 211 may transmit the response to the requesting API.

Figure 3:
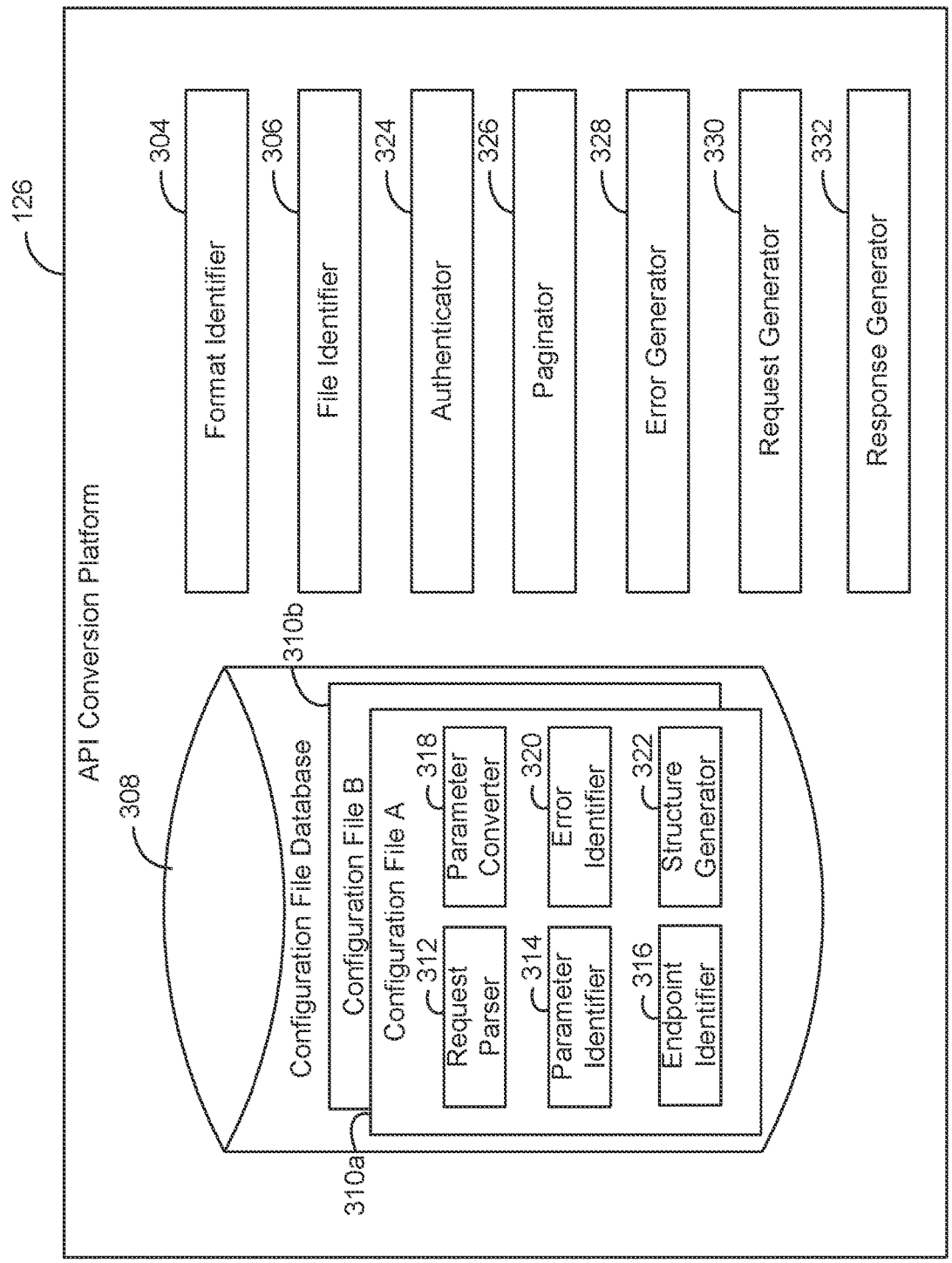
FIG. 3 is a block diagram depicting an API conversion system, according to some arrangements.

Referring now to FIG. 3, a block diagram depicting a detailed API conversion platform 126 is shown, according to some arrangements. The API conversion platform 126 is shown to include a format identifier 304, a file identifier 306, a configuration file database 308, an authenticator 324, a paginator 326, an error generator 328 and a request generator 330. The API conversion platform 126 may be configured to receive an API request. The API request may be in any format. The API conversion platform 126 may identify the format of the API request and select a configuration file based on the identified format. The API conversion platform 126 may apply the API request to the configuration file to generate a new API request for the same information that the API request is directed including any authentication, endpoint, and/or paging information, and transmit the generated API request to the same API to which the original API request was directed. The API conversion platform 126 may receive a response including the requested information and format the response in a format that the requesting API can understand. The API conversion platform 126 may transmit the response back to the requesting API.

The format identifier 304 may be a software program executed on the computing device 100, shown and described with reference to FIG. 1. The format identifier 304 may include programmed instructions to receive any API requests that are transmitted to a system in which the API conversion platform 126 is implemented (e.g., the system 214, shown and described with reference to FIG. 2) and identify the formats of the requests. In some arrangements, the format identifier 304 may identify the formats by parsing the headers of the API requests. The API request headers (such as in POST requests) may indicate which format the body of the requests are in. An example header of an API request may include the following:

Content-Type: text/xml

In this example header, the API request indicates that the body of the request is in an XML API format. The format identifier 304 may identify the API format of the API request as XML from the header. The format identifier 304 may identify the format of API requests for any API format. In some arrangements, an administrator may provide an input indicating the format of the API request. The format identifier 304 may identify the API formats of API requests based on the administrator inputs.

In some arrangements, the format identifier 304 may identify the API that sent the request and the format of the API requests. In such arrangements, once the format identifier 304 identifies which format the request was in, the format identifier 304 may associate the API with the identified format and identify the format of any future API requests that the same API sends based on the API sending the request instead of based on the header of the request. Once the format identifier 304 identifies the format of the API request, the file identifier 306 may identify a configuration file corresponding (mapped) to the API request.

The file identifier 306 may be a software program executed on the computing device 100, shown and described with reference to FIG. 1. The file identifier 306 may include programmed instructions to identify the format of API requests that are identified by the format identifier 304 and identify a corresponding configuration file in the configuration file database 308. The file identifier 306 may identify the corresponding configuration file in the configuration file database 308 by comparing the identified format of the API request to the configuration file database 308. Each configuration file in the configuration file database 308 may be tagged with an indicator indicating the format with which the configuration file is associated. In response to the file identifier 306 determining that it is unable to identify a matching configuration file, the error generator 328 may generate an error indicating that no matching configuration file could be found and present the error at a user interface of the computing device making the API request. On the other hand, in response to the file identifier 306 determining that it is able to identify a matching configuration file, the file identifier 306 may select the configuration file and apply the matching API request to the selected configuration file to generate a new request.

The configuration file database 308 can be a dynamic database including data inputs that the configuration file database 308 receives. The configuration file database 308 can be a graph database, MySQL, Oracle, Microsoft SQL, PostgreSql, DB2, document store, search engine, key-value store, etc. The configuration file database 308 may be configured to hold any amount of data and can be made up of any number of components, in some arrangements. In some arrangements, the configuration file database 308 is a cloud database that collects and stores data from computing devices other than the computing device 100. The configuration file database 308 may be configured to store configuration files for any number of API request formats so API requests may be generated in the same format regardless of the API format of the request. Each of the configuration files of the configuration file database 308 may include programmed instructions to generate the new API request. For example, a configuration file 310a is shown to include a request parser 312, a parameter identifier 314, an endpoint identifier 316, a parameter converter 318, an error identifier 320, and a structure generator 322. Each of these components may operate together to build an API request in a common format for an API of any endpoint. Configuration files may include any number of components to perform the operations of the components 312-322.

The request parser 312 may be a software program executed on the computing device 100, shown and described with reference to FIG. 1. The request parser 312 may include programmed instructions to parse through API requests to identify keywords and/or phrases of the request for the components 314-322 to use to generate an API request. For example, the request parser 312 may parse through the header and the body of the request to identify variables, parameters, endpoints, or any other aspect of the API request that may be necessary to generate a corresponding new API request. The request parser 312 may parse through API requests looking for any words or phrases that indicate that they fall into any of these categories. The request parser 312 may determine if the words or phrases fall into the categories by comparing the words or phrases to a database and identifying matching words or phrases in the database. In some arrangements, the request parser 312 may determine if the words or phrases fall into the categories based on the syntax of the API request. For example, the request parser 312 may be configured to identify the second word in the body of an API request as a request for a parameter. Accordingly, the request parser 312 may identify the second word as a parameter and the parameter identifier 314 may identify the parameter. The request parser 312 may perform any operation to identify aspects of the API request.

The parameter identifier 314 may be a software program executed on the computing device, shown and described with reference to FIG. 1. The parameter identifier 314 may include programmed instructions to identify any parameters that an API request is requesting. For example, the parameter identifier 314 may identify any parameters that are included in an initial API request. The parameter identifier 314 may identify parameters from the query string, the header, and/or the body of the API request. In some instances, the requested parameters may be variables that may vary depending on the endpoint to which the received API request is directed. Such variables may be useful when recursive API requests are needed to pull information from an API. For example, an endpoint may store data in different regions that each require different calls. An API making a request may not know which region to call in a request so the API may instead include a variable in the request to be filled in based on the region in which the data is stored. In some arrangements, the parameter identifier 314 may determine the region to make the request by calling the endpoint and receiving an indication of the correct region to make any calls for the variable.

The parameter identifier 314 may also identify authentication parameters. The parameter identifier 314 may identify authentication parameters in the header or the body of API requests, depending on where the API requests places the authentication parameters. Such authentication parameters may be passed to end points to confirm that the API has the correct authentication credentials to obtain the requested information. For example, authentication credentials may include a username/password combination, a signature, a public key, or any other authentication information to be verified by the endpoint. The parameter identifier 314 may identify the authentication parameters based on the words or syntax of the API request similar to how the parameter identifier 314 identified the other parameters.

In some arrangements, the parameter identifier 314 may identify any paging information that accompanies API requests. The parameter identifier 314 may identify the paging information from the header or the body of the request. The parameter identifier 314 may generate an indication of whether the new API request will require paging. This indication can be placed in the body, the header, the query string, or any other part of the new request. The parameter identifier 314 may also identify the name of the data structure in which the paging info can be found. The name of the data structure may be a variable. Multiple variables may be used to identify data structures for paging. Finally, the parameter identifier 314 may identify where to expect the paging information when receiving a response from the API of the endpoint.

The endpoint identifier 316 may be a software program executed on the computing device 100, shown and described with reference to FIG. 1. The endpoint identifier 316 may include programmed instructions to identify endpoints of any API requests that the API conversion platform 126 receives. An endpoint is a point in which an API receiving an API request is located. Endpoints may be the location at which any requested data is stored. The endpoint identifier 316 may identify endpoints of API requests based on the headers of the API requests. The endpoint identifier 316 may identify the endpoints using the syntax of the API request. For example, the endpoint identifier 316 may be configured to identify an endpoint based on the last words in a GET request. An example GET request is the following:

GET https://stats.rci.com/food/caloriecounter/

The endpoint identifier 316 may identify the endpoint of the above request as /food/caloriecounter/. /food/caloriecounter/ may be associated with a server or other computing device as described herein that stores caloric information about various food items. The endpoint identifier 316 may identify the endpoint based on the request. In some arrangements, the endpoint identifier 316 may identify a region of an endpoint to call when requesting data from that endpoint. The endpoint identifier 316 may do so when an endpoint stores data across multiple entities such as servers and an API making a request does not know which entity to direct the request. The endpoint identifier 316 may send a signal to the endpoint asking the location of the requested data and an API may respond with an address of the location for future requests. In some arrangements, the endpoint identifier 316 may identify the regional endpoints based administrator inputs. the endpoint identifier 316 may identify endpoints based on any method.

The parameter converter 318 may be a software program executed on the computing device, shown and described with reference to FIG. 1. The parameter converter 318 may include programmed instructions to convert any parameters that are identified in API requests into a new API format that is readable by the API to which the API requests are directed. To do so, the parameter converter 318 may identify any parameters that the parameter identifier 314 identifies. The parameter converter 318 may be configured to convert the identified parameters into the correct syntax of the new API format. For example, the parameter converter 318 may convert a parameter in XML format into a parameter in JSON format. The parameter in XML format may have opening and closing tags indicating the parameter that is being requested in the API request. The parameters in JSON may be set apart by various symbols. The parameter converter 318 may convert the format of the requested parameter by generating a new request including a request for the same parameter but using name/value pairs (which are common in the JSON format) that are delineated by various symbols such as "{", "}", "[", "]", and ":" in the JSON format. Depending on the configuration file, the parameter converter of the configuration file may convert a parameter request in any format to a parameter request in any other format. For instance, parameter converters may convert requests from XML to JSON (as shown above), from JSON to XML, from XML to YAML, from YAML to XML, from JSON to YAML, from YAML to JSON, etc.

The error identifier 320 may be a software program executed on the computing device 100, shown and described with reference to FIG. 1. The error identifier 320 may include programmed instructions to identify any errors that occurred when the configuration file 310 was generating a new request in the new format. An error may be an identification that a portion of an API request could not be converted into a new API request. Such errors may occur if the request included a syntax that the configuration file 310 could not handle, spelling errors, an improper endpoint identification, improper authentication information, requested data could not be found by the endpoint API (i.e., in cases with recursive calls), or any other errors that may occur when the configuration file 310 is generating a new request. The error identifier 320 may identify such errors and generate an error to display at a user interface of the requesting API indicating what the error was and which data could not be retrieved based on the API request. The error identifier 320 may generate the error by creating an array that includes each of the errors. The error identifier 320 may generate the array in the new API format or in a format that the requesting API can otherwise understand to display at its respective computing device.

The structure generator 322 may be a software program executed on the computing device 100, shown and described with reference to FIG. 1. The structure generator 322 may include programmed instructions to use any identified parameters (including authentication and paging information), endpoint(s), and/or errors to generate structures for new API requests. The structure generator 322 may identify any converted parameters, endpoints, variables, and any other type of data that were identified or converted by the parameter identifier 314, the endpoint identifier 316, and/or the parameter converter 318 and generate a new request with a data structure that the API of the endpoint may handle. The data structure may include parameters in a syntax of a common API format such as JSON, YAML, XML, or any other API format. In some arrangements, the data structure may include a syntax that is specific to the configuration file. All or a portion of the parameters or other API request information that is included in API requests that the API conversion platform 126 generates may be generated in a new format in the new API request that the API of the endpoint may receive and understand.

In some instances, the structure generator 322 may include any authentication information in the new API request in the header of a new API request instead of including it as a parameter in the body of the request. The structure generator 322 may do so based on the API of the endpoint and how it is configured to authenticate API requests. In these scenarios, the structure generator 322 may keep the authentication information in the same format that it was in in the original request or generate the authentication information in the new API request in the new format. Accordingly, the structure generator 322 may generate an API request in a new format including similar information to the request that the API conversion platform 126 received in the original request.

The authenticator 324 may be a software program executed on the computing device 100, shown and described with reference to FIG. 1. The authenticator 324 may include programmed instructions to determine whether an API making a request is authorized to make such a request. The authenticator 324 may determine whether the output of the configuration file associated with the request includes authorization parameters. In response to determining that there are not any authorization parameters in the output, authenticator may use authentication parameters of a previous API call to call the API of the same endpoint. For example, the authenticator 324 may input username and password information or key information (depending on the endpoint) to the new API request if it is not already included in the output of the configuration file. Consequently, an API making requests to the same endpoint may only need to provide authentication information once and the authenticator 324 may propagate the authentication information into any future API requests.

The paginator 326 may be a software program executed on the computing device 100, shown and described with reference to FIG. 1. The paginator 326 may include programmed instructions to determine whether there are any more results of the API request the need to be peeked through. The paginator 326 may identify the default number of results from the configuration files and determine whether there are any more results of the request need to be paged through. In response to the paginator 326 determining that there are more results that need to be paged through, the paginator 326 or some other component of the API conversion platform 126 may page through the results or request to view the next page of the results from the API of the endpoint. Otherwise, the response generator 332 may proceed to transmit the results of the request to the requesting API.

The error generator 328 may be a software program executed on the computing device 100, shown and described with reference to FIG. 1. The error generator 328 may include programmed instructions to identify any errors that the configuration file that generated the API request generated. In some arrangements, the error generator 328 may be the same component or be in communication with the error identifier 320. The error generator 328 may generate a data structure including any error information that the error identifier 320 of the configuration file 310a identified and/or generated. The error generator 328 may generate the data structure to be included in the response to the original API request. In some arrangements, the error generator 328 may generate any errors that the error identifier 320 identified or generated into a format that is readable by the requesting API. Such errors may be generated to be displayed on a user interface of the computing device of the requesting API.

The request generator 330 may be a software program executed on the computing device 100, shown and described with reference to FIG. 1. The request generator 330 may include programmed instructions to generate an API request based on the parameters and other information that is collected and otherwise generated by a configuration file of the configuration file database 308. The request generator 330 may dynamically build the request by collecting the any parameters that were generated by the configuration file and using the collected parameters to set up the header variables that need to be passed, encoding the request however it needs to be encoded whether it needs to be encoded in URL or some other form of coding (depending on the endpoint), etc. The request generator 330 may also include authentication information (e.g., username and password) in the request including any time values that may be used for authentication. The request generator 330 may send the generated request to the API of the endpoint. The API of the endpoint may generate and transmit a response to the request including the requested information. The response generator 332 may receive the response and transmit it to the requesting API.

The response generator 332 may be a software program executed on the computing device 100, shown and described with reference to FIG. 1. The response generator 332 may include programmed instructions to make sure the response includes valid information to transmit back to the requesting API. The response generator 332 may check to make sure that the API conversion system 126 got a valid result and to make sure the same request has not been run before adding any information that may be used in future requests (e.g., authentication information that may be stored for future requests) to a data structure of the API conversion platform 126. The response generator 332 may check to see whether all of the requested information is in the response and check for an indicator of whether the paginator 326 needs to do any paging. In response to determining that the indicator indicates that paging is necessary to identify any desired results of the request, the paginator 326 may recursively request information from the API of the endpoint until the response generator 332 determines that all of the necessary information has been included. The Response generator 332 may combine all of the data that has been paged and make sure the paginator 326 does not need to make any more requests. In response to the response generator 332 determining that all of the requested information is a part of the response and/or any errors have been added to the response, the response generator 332 may transmit the response to the requesting API.

Figure 4:
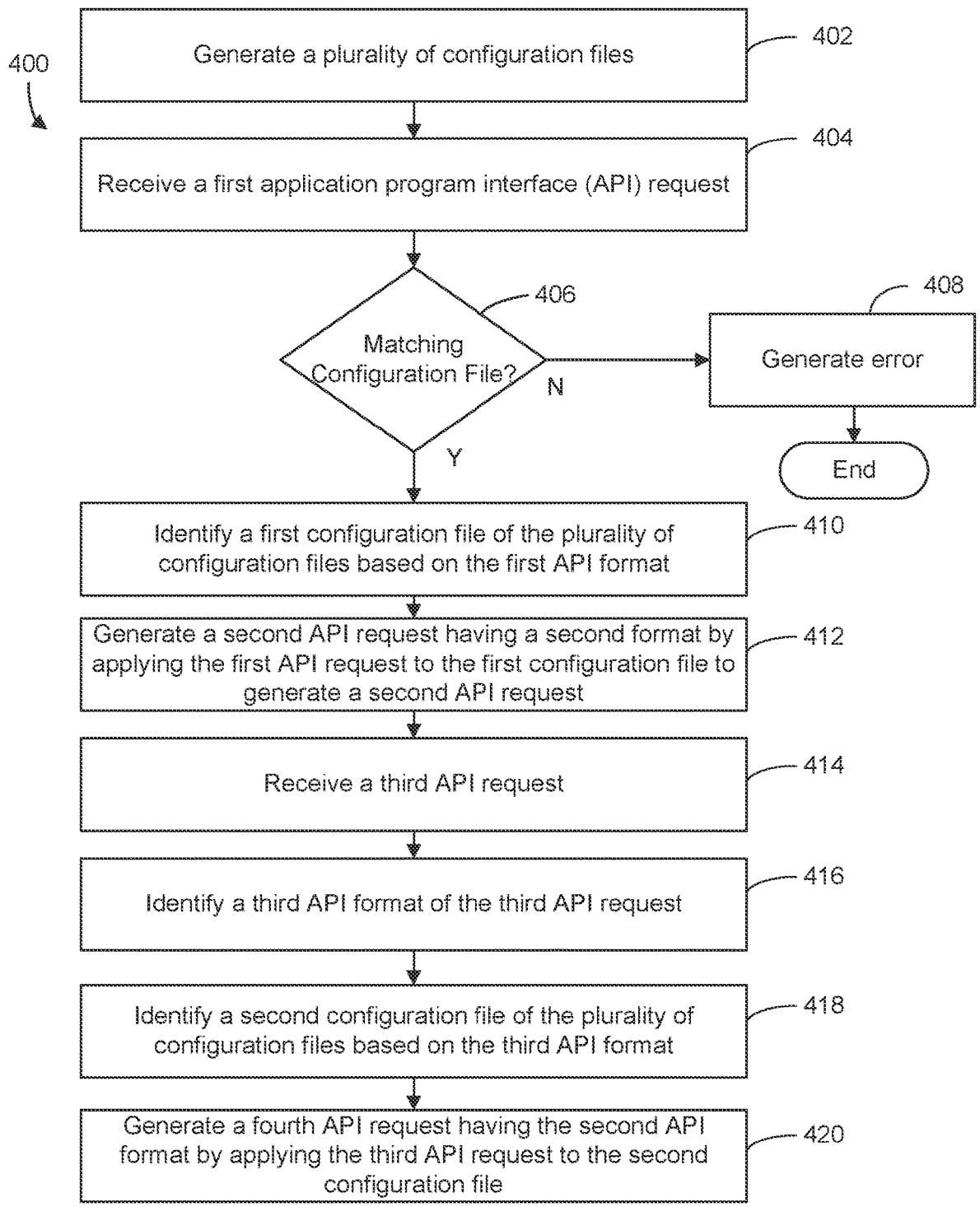
FIG. 4 is a flow diagram of a method for generating API requests with a common format, according to some arrangements.

Referring now to FIG. 4, a flow diagram of a method 400 for generating API requests with a common format is shown, according to some arrangements. The method 400 may be implemented using, or performed by, the components detailed herein in connection with FIGS. 1-3. Referring to FIGS. 1-4, the method 400 may be performed by any of the components of the API conversion platform 126 in response to receipt of an API request. The method 400 may be used to receive an API request in one format and generate a new API request in a different format that an API of an endpoint may understand.

At 402, the API conversion platform 126 may generate a plurality of configuration files. A configuration file may be a file that performs operations on API requests to convert (or generate) the API requests from one format into a second format. While API files may each convert API requests into a common API format, each configuration file may only convert API requests in a specific format to the common API format. For example, one configuration file may convert an API request from YAML to JSON. Another configuration file may convert an API request from XML to JSON. In some examples, such conversions may be the only conversions that each of the configuration files may perform. To perform the conversion, each configuration file may be configured to handle any parameters, authentication information, paging information, variables, or any other aspect of an API request that is format specific. Each configuration file may identify the aspects of the requests and generate a corresponding data structure that includes the same aspects but in a new API format.

At 404, the API conversion platform 126 may receive a first API request. The API conversion platform 126 may receive the first API request from an API that is on the same computing device or from another computing device across a network. The first API request may be directed to an API of an endpoint to obtain information from the endpoint. At 406, the API conversion platform 126 may determine whether there a configuration file in a database of the API conversion platform 126 that corresponds to a format of the first API request. To do so, the API conversion platform 126 may identify the format of the first API request (e.g., based on its header or on an administrator input) and compare the format to the database that stores configuration files. The API conversion platform 126 may identify tags on the configuration files to determine whether any of them are associated with the same format as the first API request. In response to determining that the API conversion platform 126 cannot identify a matching configuration file, at 408, the API conversion platform 126 may generate an error indicating that no matching configuration file could be found and transmit the error to the requesting API. In some arrangements, the API conversion platform 126 may also transmit the error to the API that was supposed to be the correct to inform the API that an attempt to request information from the API was made and was unsuccessful.

In response to the API conversion platform 126 identifying a matching configuration file, at 410, the API conversion platform 126 may identify the configuration file (e.g., a first configuration file) to which the first API corresponds (e.g., that is associated with the API format of the first API request). At 412, the API conversion platform 126 may generate a second API request having a second API format by applying the first API request to the corresponding configuration file. The second format may be a different format than the first format. For example, the first format may be any of JSON, XML, or YAML and the second format be a different format of the same group of formats. In some arrangements, the second format is an abstract format that is not related to any well-known API formats but is still readable by an API of the endpoint. Described in more detail below with reference to FIG. 5, the configuration file may generate a data structure that the API conversion platform 126 may use to generate the second API request. The API conversion platform 126 may generate the second API request based on the endpoint to which it is transmitting the API request (in some instances the configuration file may generate a data structure that is specific to the endpoint as well). For example, the API conversion platform 126 may generate the second request to have the authentication parameters, paging information, and any other information that may be uniquely associated with the endpoint. After generating the second API request, the API conversion platform 126 may transmit the second API request to the API of the endpoint.

At 414, the API conversion platform 126 may receive a third API request. The API conversion platform 126 may perform 414 similar to how the API conversion platform 126 performed 404. At 416, the API conversion platform 126 may identify a third API format of the third API request 416. Although not shown, the API conversion platform 126 may then determine whether there is a corresponding configuration file to the third API format in the database of the API conversion platform 126 similar to 406 and perform an operation similar to 408 in response to there not being a corresponding configuration file in the API conversion platform 126. In response to determining that a matching configuration file is identified, at 418, the API conversion platform 126 may identify the matching configuration file as a second configuration file. The API conversion platform 126 may perform 418 similar to how the API conversion platform 126 performed 410. At 420, the API conversion platform 126 may generate a fourth API request having the second API format by applying the third API request to the second configuration file.

Figure 5:
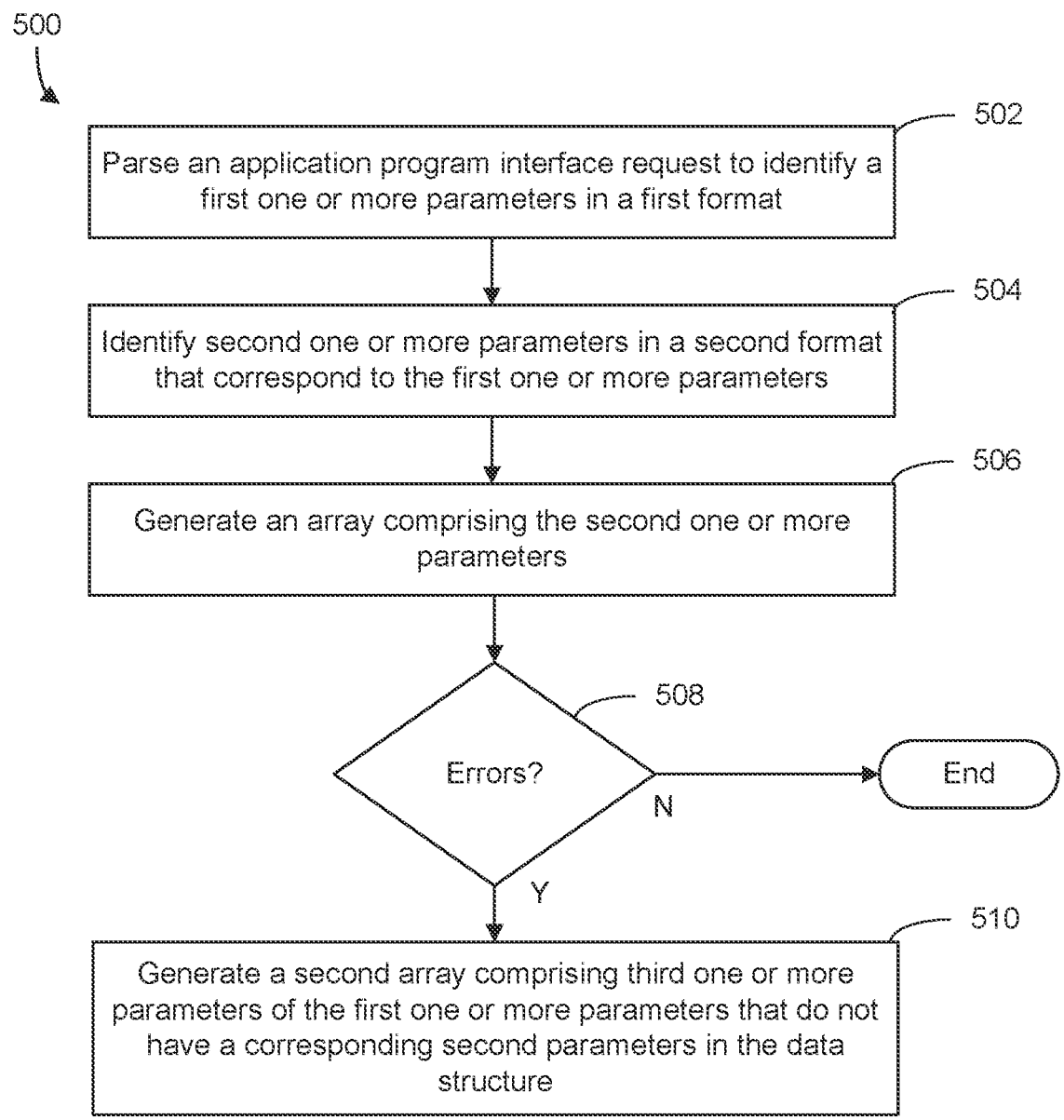
FIG. 5 is a flow diagram of a method performed using a configuration file for converting an API request having one format to an API request having a common format, according to some arrangements.

Referring now to FIG. 5, a flow diagram of a method 500 performed by a configuration file for converting an API request having a first format to an API request having a second format is shown, according to some arrangements. The functionalities of the method or process 500 may be implemented using, or performed by, the components detailed herein in connection with FIGS. 1-3. For example, method 500 may be performed by any of the configuration files 310a-310n of the API conversion platform 126 in response to receipt of an API request. In brief overview, method 500 may be used to generate an array of parameters that are compatible with a second API format that the API of an endpoint may process and, in some cases, an array of parameters that may not be retrieved because of an error in the request.

In more detail, when the API conversion platform 126 receives an API request, the format identifier 304 may identify the format of the API request from its header and the file identifier 306 may identify a corresponding configuration file of the API conversion platform 126 to the identified format of the API request. In various arrangements, the identified corresponding configuration file may be a source file, a header file, a PCH file, a resource file, or the like. The file identifier 306 may apply the API request to the identified corresponding configuration file (e.g., the configuration file 310a) to generate a new API request with an API format that is readable to the API that receives the request. For example, the method 500 starts, and at 502, the request parser 312 of the configuration file 310a may parse the API request that was applied to the configuration file 310a to identify a first one or more parameters in a first format. The request parser 312 may parse through the API request and identify each parameter that is being requested in the request. The request parser 312 may identify the requested parameters based on the format of the requested parameters.

For example, a configuration file that is specific to requests that are received in the YAML format may be configured with a base key identifying how the JSON parameters would be formatted if they were formatted correctly in the request. The request parser 312 may compare the words and/or phrases of the API request to this format and identify any words or phrases that follow the same format. For example, the configuration file for YAML requests may identify a current parameter to be "DescribeInternetGatewayResponse.InternetGateway Set" because the parameter is correctly formatted as a YAML parameter. In some instances, the current parameter may be an address from which to pull data. At 504, the parameter converter 318 may identify the current parameter and convert the current parameter to a desired parameter based on the current parameter. Continuing with the example above, the parameter converter 318 may convert the current parameter above to the desired parameter of "InternetGateways". The API of the endpoint may be able to read the desired parameter but may not be able to read the current parameter based on the formatting of each parameter. In another example, the request parser 312 may identify a current parameter of "items.global.addresses." The parameter converter 318 may convert this current parameter to a desired parameter of "Addresses." Accordingly, when the API request is generated the request may call Addresses location of the API instead of items.global.addresses per the API format in the original request. The request parser 312 and the parameter converter 318 may identify any base parameters in the request and generate any desired parameters.

At 506, the structure generator 322 may generate an array comprising the second one or more parameters. The structure generator 322 may generate the array as the request parser 312 continues to parse through the API request and identify parameters to be converted into the new API format by the parameter converter 318. The structure generator 322 may identify any converted parameters, endpoints, variables, or any other type of data that was identified or converted by the parameter identifier 314, the endpoint identifier 316, and/or the parameter converter 318 and generate a new request with a data structure that the API of the endpoint may handle. The data structure may include a syntax of a common API format such as JSON, YAML, XML, or any other API format. In some arrangements, the data structure may include a syntax that is specific to the configuration file, the API of the endpoint, or the endpoint itself. All or a portion of the parameters or other API request information that is included in API requests that the API conversion platform 126 generates may be generated in a new format in the new API request that the API of the endpoint may receive and understand.

At 508, the error identifier 320 may determine whether there are any errors in the API request. The error identifier 320 may determine if there are any errors in the API request by determining whether there are any parameters in the API request that could not be converted to a new format. The error identifier 320 may make such a determination in response to the error identifier 320 not being able to identify a parameter in the new API format that corresponds to the parameter in the API format of the original API request. The error identifier 320 may also identify errors if the original was not formatted correctly or had incorrect wording or phrasing in one or more portions of the request. The error identifier 320 may identify errors in API requests for any reason. In response to the error identifier 320 not being able to identify any errors in the original API request, the process 500 may end and the API conversion system 126 may generate a request using the array that the structure generator 322 generated including successfully converted parameters.

On the other hand, in response to the error identifier 320 identifying errors in the original API request, at 510, the error identifier 320 may generate a second array including any parameters that could not be converted into the second format. The error identifier 320 may generate the array as parameter converter 318 attempts and fails to convert parameters into the second format for various reasons as described above. The error identifier 320 may generate the array in a base form and convert it into a form that is readable by the API to which the original API was requested and/or the API that made the request. The error identifier 320 may include any number of errors in the array. In some arrangements, the error identifier 320 may generate the array so it can be displayed on a user interface for an operator to see to view any errors that occurred including the parameter with which the error is associated.

The systems and methods described herein may provide for a tool that may only require a configuration file specific to an API format to convert or generate an API request with a new format. The systems and methods provide for handling of authentication, paging, and other API format specific protocols that an API receiving a request in such a format may not be equipped to understand or respond to. The API request may be uploaded to a configuration file and the configuration file can automatically generate abstract API requests with formats that differ from any requests that the API receives but that are readable to the APIs that receive the requests. Consequently, systems with different APIs may more quickly and easily be integrated to communicate with each other.

The arrangements described herein have been described with reference to drawings. The drawings illustrate certain details of specific arrangements that implement the systems, methods and programs described herein. However, describing the arrangements with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some arrangements, each respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors, etc. In some arrangements, a circuit can take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

The "circuit" can also include one or more processors communicatively coupled to one or more memory or memory devices. In this regard, the one or more processors can execute instructions stored in the memory or can execute instructions otherwise accessible to the one or more processors. In some arrangements, the one or more processors can be embodied in various ways. The one or more processors can be constructed in a manner sufficient to perform at least the operations described herein. In some arrangements, the one or more processors can be shared by multiple circuits (e.g., circuit A and circuit B can comprise or otherwise share the same processor which, in some example arrangements, can execute instructions stored, or otherwise accessed, via different areas of memory). Alternatively or additionally, the one or more processors can be structured to perform or otherwise execute certain operations independent of one or more co-processors. In other example arrangements, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some arrangements, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud based server). To that end, a "circuit" as described herein can include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some arrangements, the non-volatile media can take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media can take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or can be acquired from this disclosure. The arrangements were chosen and described in order to explain the principals of the disclosure and its practical application to enable one skilled in the art to utilize the various arrangements and with various modifications as are suited to the particular use contemplated.

Other substitutions, modifications, changes and omissions can be made in the design, operating conditions and arrangement of the arrangements without departing from the scope of the present disclosure as expressed in the appended claims.

What is claimed is:

1. A method for application program interface (API) request conversion, comprising:
   generating, by one or more processors, a plurality of configuration files, each configuration file associated with a different API format;
   receiving, by the one or more processors, a first API request;
   identifying, by the one or more processors, a first API format of the first API request;
   identifying, by the one or more processors, a first configuration file of the plurality of configuration files based on the first API format;
   generating, by the one or more processors, a second API request having a second API format by applying the first API request to the first configuration file;
   receiving, by the one or more processors, a third API request;
   identifying, by the one or more processors, a third API format of the third API request;
   identifying, by the one or more processors, a second configuration file of the plurality of configuration files based on the third API format; and
   generating, by the one or more processors, a fourth API request having the second API format by applying the third API request to the second configuration file to generate the fourth API request having the second API format.

2. The method of claim 1, further comprising:
   identifying, by the one or more processors, an endpoint at which the first API request is directed;
   retrieving, by the one or more processors, data from the endpoint based on the second API request having the second API format;
   converting, by the one or more processors, the data from the endpoint into the first format; and
   transmitting, by the one or more processors, the data from the endpoint in the first format.

3. The method of claim 1, further comprising:
   identifying, by the one or more processors, an endpoint at which the first API request is directed;
   retrieving, by the one or more processors, data from the endpoint based on the second API request having the second API format;
   transmitting, by the one or more processors, the data from the endpoint in the second format.

4. The method of claim 1, wherein identifying the first API format comprises:
   receiving, by the one or more processors, an indication of a source of the first API request; and
   identifying, by the one or more processors, the first API format based on the source of the first API request.

5. The method of claim 1, wherein the second API format has a different structure than the first API format and the third API format.

6. The method of claim 1, wherein generating the second API request comprises:
   parsing, via the configuration file and by the one or more processors, the first API request to identify first one or more parameters;
   comparing, via the configuration file and by the one or more processors, the first one or more parameters to a data structure, the data structure comprising a plurality of parameters associated with the second API format; and
   generating, via the configuration file and by the one or more processors, second one or more parameters associated with the second API format based on the comparison of the first one or more parameters to the data structure.

7. The method of claim 1, wherein the second API format is one of Extensible Markup Language, Yet another markup language, or JavaScript Object Notation.

8. The method of claim 1, wherein the first API request comprises authentication information in the first format, and wherein the second API request comprises the authentication information in the second format.

9. The method of claim 1, wherein generating the second API request comprises:
   obtaining, by the one or more processors, endpoints from which to receive data by recursively applying, by the one or more processors, the first API request to the first configuration file.

10. The method of claim 9, wherein recursively applying the first API request to the first configuration file comprises:
    obtaining variables indicating endpoints to specify in an API request by applying the first API request to the first configuration; and
    applying the first API request to the first configuration file for a second time but with the obtained variables indicating the endpoints.

11. The method of claim 1, wherein generating the second API request comprises:
    parsing, via the configuration file by the one or more processors, the first API request to identify first one or more parameters;
    comparing, via the configuration file by the one or more processors, the first one or more parameters to a data structure, the data structure comprising a plurality of parameters associated with the second API format; and
    determining, via the configuration file by the one or more processors, second one or more parameters of the first one or more parameters that do not correspond to a parameter of the plurality of parameters based on the comparison of the first one or more parameters;
    wherein the method further comprises:
    generating, by the one or more processors, an alert indicating that the second one or more parameters could not be transformed into the second format; and
    displaying, by the one or more processors, the alert on a user interface.

12. The method of claim 1, further comprising:
    receiving, by the one or more processors, a fifth API request having a fifth format;
    comparing, by the one or more processors, an identification of the fifth format to a database;
    determining, by the one or more processors, that there is not a configuration file associated with the fifth format based on the comparison of the identification of the fifth format to the database;
    generating, by the one or more processors, an alert indicating that there is not a configuration file associated with the fifth format; and
    displaying, by the one or more processors, the alert on a user interface.

13. The method of claim 1, wherein the first API request comprises authentication information appended to the first API request, and wherein the authentication information is transmitted to an endpoint without being converted to another format.

14. The method of claim 1, wherein generating the second API request comprises generating an array comprising values from a plurality of locations of an endpoint.

15. A system for application program interface (API) request conversion, the system comprising:
one or more processors; and
memory coupled to the one or more processors and storing instructions that, when executed by the one or more processors, cause the one or more processors to:
generate a plurality of configuration files, each configuration file associated with a different API format;
receive a first API request;
identify a first API format of the first API request;
identify a first configuration file of the plurality of configuration files based on the first API format;
generate a second API request having a second API format by applying the first API request to the first configuration file;
receive a third API request;
identify a third API format of the third API request;
identify a second configuration file of the plurality of configuration files based on the third API format; and
generate a fourth API request having the second API format by applying the third API request to the second configuration file to generate a fourth API request having the second API format.

16. The system of claim 15, wherein the instructions, when executed, further cause the processor to:
identify endpoint at which the first API request is directed;
retrieve data from the endpoint based on the second API request having the second API format;
convert the data from the endpoint into the first format; and
transmit the data from the endpoint in the first format.

17. The system of claim 15, wherein the instructions, when executed, further cause the processor to:
identify an endpoint at which the first API request is directed;
retrieve data from the endpoint based on the second API request having the second API format;
transmit the data from the endpoint in the second format.

18. The system of claim 15, wherein the instructions, when executed, cause the processor to identify the first API format:
receiving an indication of a source of the first API request; and
identifying the first API format based on the source of the first API request.

19. The system of claim 15, wherein the second API format has a different structure than the first API format and the third API format.

20. The system of claim 15, wherein generating the second API request comprises:
parsing, via the configuration file, the first API request to identify first one or more parameters;
comparing, via the configuration file, the first one or more parameters to a data structure, the data structure comprising a plurality of parameters associated with the second API format;
and generating, via the configuration file, second one or more parameters associated with the second API format based on the comparison of the first one or more parameters to the data structure.

* * * * *